(12) United States Patent
Naito

(10) Patent No.: US 12,013,728 B2
(45) Date of Patent: Jun. 18, 2024

(54) DISPLAY APPARATUS

(71) Applicant: JOLED INC., Tokyo (JP)

(72) Inventor: Nobuo Naito, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 17/648,276

(22) Filed: Jan. 18, 2022

(65) Prior Publication Data

US 2022/0232711 A1 Jul. 21, 2022

(30) Foreign Application Priority Data

Jan. 21, 2021 (JP) .................. 2021-008245

(51) Int. Cl.
*G06F 1/16* (2006.01)

(52) U.S. Cl.
CPC .......... *G06F 1/1652* (2013.01); *G06F 1/1637* (2013.01)

(58) Field of Classification Search
CPC .... G06F 1/1651; G06F 1/1637; G06F 1/1652; G06F 1/1601; G09F 9/301
See application file for complete search history.

(56) References Cited

U.S. PATENT DOCUMENTS

| | | | | |
|---|---|---|---|---|
| 10,081,887 B2* | 9/2018 | Manipatruni | .......... | D02G 3/441 |
| 2004/0228077 A1* | 11/2004 | Hall | .......... | G06F 1/1624 361/679.25 |
| 2005/0162606 A1* | 7/2005 | Doane | .......... | G02F 1/133305 349/158 |
| 2008/0109941 A1* | 5/2008 | Moreshead | .......... | D06N 3/0002 2/243.1 |
| 2009/0035549 A1* | 2/2009 | Lev | .......... | G06F 1/1613 428/297.4 |
| 2011/0128686 A1* | 6/2011 | Moreshead | .......... | H05B 3/347 361/679.01 |
| 2011/0222220 A1* | 9/2011 | Murakata | .......... | H05K 9/0054 361/679.01 |
| 2013/0170116 A1* | 7/2013 | In | .......... | G02F 1/133308 361/679.01 |
| 2015/0069904 A1* | 3/2015 | Suzuki | .......... | G09F 9/30 445/24 |
| 2015/0314326 A1* | 11/2015 | Park | .......... | D06C 15/00 264/447 |
| 2016/0190513 A1* | 6/2016 | Kim | .......... | H10K 50/80 427/58 |
| 2017/0052422 A1* | 2/2017 | Kazlas | .......... | G02F 1/0102 |
| 2017/0192336 A1* | 7/2017 | Kaino | .......... | G02F 1/133553 |
| 2017/0301873 A1* | 10/2017 | Park | .......... | D06M 11/46 |

(Continued)

FOREIGN PATENT DOCUMENTS

| CN | 110009998 A | 7/2019 |
|---|---|---|
| CN | 111418265 A | 7/2020 |

(Continued)

OTHER PUBLICATIONS

Office Action for CN Patent Application No. 202111635213.8, dated Oct. 30, 2023, 7 pages of Office Action.

*Primary Examiner* — Sagar Shrestha
(74) *Attorney, Agent, or Firm* — CHIP LAW GROUP

(57) ABSTRACT

A display apparatus includes a display panel that is flexible, the display panel including a display surface and a back surface on a back side of the display surface, and a protection sheet attached to the back surface of the display panel and formed from woven fabric.

11 Claims, 5 Drawing Sheets

(56) References Cited

U.S. PATENT DOCUMENTS

| | | | |
|---|---|---|---|
| 2019/0025953 A1* | 1/2019 | Ma | B32B 27/281 |
| 2019/0064881 A1 | 2/2019 | Kim et al. | |
| 2019/0140199 A1* | 5/2019 | Senoo | H10K 59/12 |
| 2019/0172377 A1 | 6/2019 | Kim et al. | |
| 2019/0179373 A1* | 6/2019 | Cheng | H04M 1/0216 |
| 2020/0150727 A1* | 5/2020 | Ho | B29C 66/7292 |
| 2021/0066626 A1* | 3/2021 | Park | G02F 1/133305 |
| 2021/0119174 A1 | 4/2021 | Yamamoto et al. | |
| 2021/0173434 A1* | 6/2021 | Campbell | G06F 1/1616 |
| 2021/0352809 A1* | 11/2021 | Kim | H10K 77/111 |
| 2021/0365072 A1* | 11/2021 | Kinoshita | G06F 1/1616 |
| 2022/0029124 A1* | 1/2022 | Kang | H10K 50/844 |
| 2022/0216436 A1* | 7/2022 | Kim | G06F 1/1652 |

FOREIGN PATENT DOCUMENTS

| | | | |
|---|---|---|---|
| JP | 2019045855 A | 3/2019 | |
| WO | 2016108329 A1 | 7/2016 | |

* cited by examiner

DISPLAY APPARATUS

CROSS REFERENCE TO RELATED APPLICATIONS

This application is claims priority benefit of Japanese Patent Application No. JP 2021-008245 filed in the Japan Patent Office on Jan. 21, 2021. The above-referenced application is hereby incorporated by reference in its entirety.

BACKGROUND

The present disclosure relates to a display apparatus.

In the past, an active-matrix display apparatus with light emitting element such as organic electro-luminescence (EL) element has been in practical use. There is a known technique in which a flexible display panel with flexible board is adopted in the display apparatus (for example, see Japanese Patent Laid-Open No. 2019-45855 (hereinafter, referred to as Patent Document 1)). The display apparatus described in Patent Document 1 includes cylindrical back bars on the back surface of the flexible display panel and side caps connecting the back bars. The back bars are intended to protect the display panel.

SUMMARY

In the display apparatus described in Patent Document 1, a fold or a curl remains on the display panel when the display panel is bent or rolled up. Therefore, large tension may need to be applied to the display panel to secure the flatness of the display panel when an image is displayed on the display panel. As a result, the tension may possibly damage the inside of the display panel. For example, an inorganic material film (such as a sealing film and a cathode electrode film) formed inside of the display panel may be cracked. A display failure may occur in the display apparatus when such a crack is generated. Although the toughness of the back bars and the side caps can be increased in the display apparatus described in Patent Document 1 to suppress the generation of the crack, the configuration of the back surface becomes complicated.

A protection member such as silicon foam can be provided on the back surface of the display panel to simplify the configuration of the back surface of the display panel. However, it is difficult to secure the toughness by using such a protection member, and the damage of the display panel may not sufficiently be suppressed.

The present disclosure has been made to solve the problems, and it is desirable to provide a display apparatus with a simplified configuration that can suppress damage of a flexible display panel.

According to an example of the present disclosure, there is provided a display apparatus including a display panel that is flexible, the display panel including a display surface and a back surface on a back side of the display surface, and a protection sheet attached to the back surface of the display panel and formed from woven fabric.

According to the example of the present disclosure, the display apparatus with a simplified configuration that can suppress damage of the flexible display panel can be provided.

DETAILED DESCRIPTION OF THE PREFERRED EMBODIMENTS

Figure 1A:
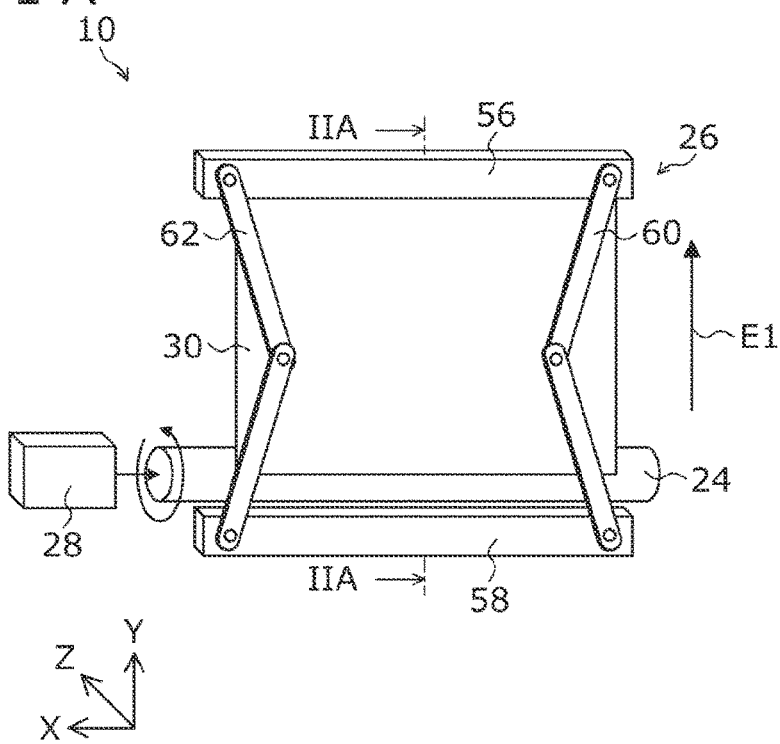
FIG. 1A is a first perspective view illustrating a display apparatus according to a first embodiment.

Embodiments of the present disclosure will now be described with reference to the drawings. Note that each of the embodiments described below illustrates a specific example of the present disclosure. Therefore, values, shapes, materials, constituent elements, arrangement positions and connection modes of the constituent elements, processes, and orders of the processes illustrated in the following embodiments are examples and are not intended to limit the present disclosure. Therefore, among the constituent elements in the following embodiments, constituent elements that are not described in the independent claims representing the highest level concept of the present disclosure are described as any constituent elements.

Further, the drawings are schematic diagrams, and the drawings may not strictly be illustrated. Therefore, for example, the reduced scales may not necessarily coincide in the drawings. Note that, in the drawings, the same reference signs are provided to substantially the same components, and the duplicate description will be omitted or simplified.

First Embodiment

A display apparatus according to a first embodiment will be described.

[1-1. Overall Configuration of Display Apparatus]

Figure 1B:
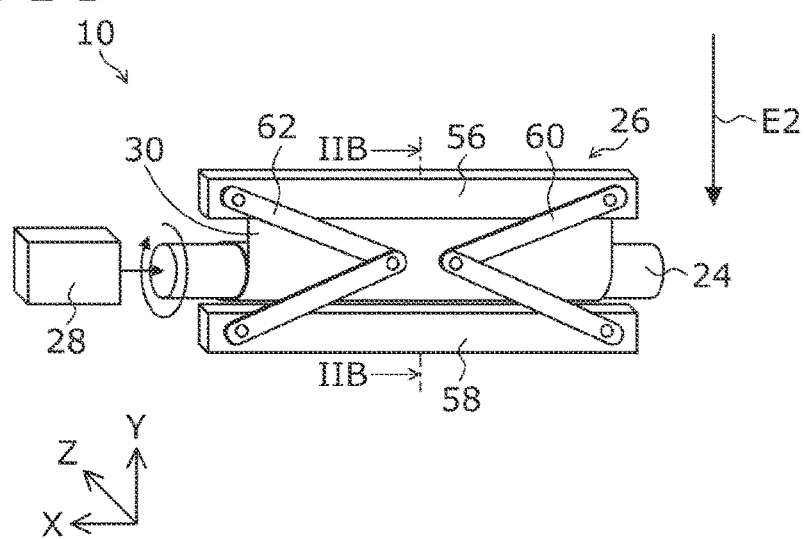
FIG. 1B is a second perspective view illustrating the display apparatus according to the first embodiment.
Figure 2A:
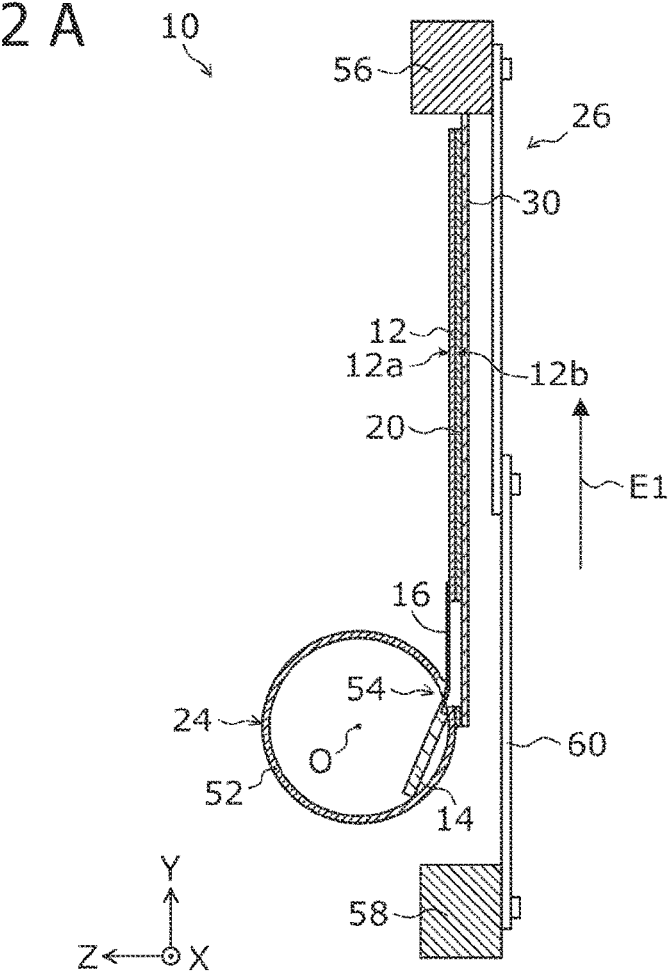
FIG. 2A is a first cross-sectional view illustrating the display apparatus according to the first embodiment.
Figure 2B:
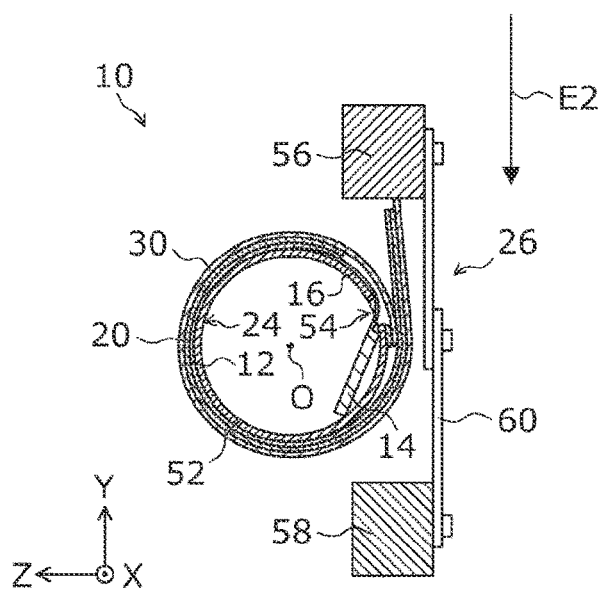
FIG. 2B is a second cross-sectional view illustrating the display apparatus according to the first embodiment.

An overall configuration of the display apparatus according to the present embodiment will be described with reference to FIGS. 1A and 1B. FIGS. 1A and 1B are first and second perspective views, respectively, illustrating a display apparatus 10 according to the present embodiment. FIG. 1A illustrates the display apparatus 10 in a state in which a flexible display panel 12 included in the display apparatus 10 is extended. FIG. 1B illustrates the display apparatus 10 in a state in which the flexible display panel 12 is rolled up. FIGS. 2A and 2B are first and second cross-sectional views, respectively, illustrating the display apparatus 10 according to the present embodiment. FIG. 2A illustrates a cross section along a line IIA-IIA in FIG. 1, and FIG. 2B illustrates a cross section along a line IIB-IIB in FIG. 1B.

As illustrated in FIGS. 2A and 2B, the display apparatus 10 according to the present embodiment includes the display panel 12 and a protection sheet 30. In the present embodiment, the display apparatus 10 further includes an adhesive member 20, a drive board 14, a flexible board 16, a core 24, and a pantograph unit 26. As illustrated in FIGS. 1A and 1B, the display apparatus 10 further includes a motor 28. The display apparatus 10 is a rollable display apparatus that can roll up the display panel 12, the flexible board 16, the adhesive member 20, and the protection sheet 30 and that can draw out the rolled display panel 12 and other components. The display apparatus 10 is used in, for example, a tablet terminal, a digital television, digital signage, a smartphone, or a wearable terminal.

The display panel 12 illustrated in FIGS. 2A and 2B includes a display surface 12a for displaying an image and a back surface 12b on the back side of the display surface 12a, and the display panel 12 is a flexible panel (in other words, the display panel 12 has flexibility). The display panel 12 is what is called a flexible display panel. The display panel 12 has a rectangular shape with a first direction (that is, Y-axis direction) as the transverse direction and a second direction (that is, X-axis direction) as the longitudinal direction in a state in which the display panel 12 is drawn out from the core 24 as illustrated in FIG. 2A. With a third direction (that is, Z-axis direction) of the display panel 12 as the thickness direction, the display panel 12 displays an image toward one side in the third direction (that is, positive side in the Z-axis direction). The display panel 12 includes, for example, an organic light emitting diode (OLED) panel and other panels. The thickness direction of the display panel 12 coincides with the thickness direction of the protection sheet 30.

The protection sheet 30 illustrated in FIGS. 1A to 2B is a sheet-shaped member attached to the back surface 12b of the display panel 12 and formed from woven fabric. The details of the protection sheet 30 will be described later.

The adhesive member 20 illustrated in FIGS. 2A and 2B is a member that is arranged between the display panel 12 and the protection sheet 30 and that bonds the display panel 12 and the protection sheet 30. Although the adhesive member 20 is in direct contact with the display panel 12 and the protection sheet 30 in the present embodiment, the adhesive member 20 may be in indirect contact with the display panel 12 and the protection sheet 30. For example, another member may be placed between the adhesive member 20 and the display panel 12. The adhesive member 20 may be arranged on the entire back surface 12b of the display panel 12 or may be arranged on only part of the back surface 12b. For example, the adhesive member 20 may be arranged on only the periphery of the back surface 12b of the display panel 12. The adhesive member 20 is not particularly limited as long as the member can bond the display panel 12 and the protection sheet 30. In the present embodiment, the adhesive member 20 is a double-sided tape with a thickness of 125 μm.

The drive board 14 illustrated in FIGS. 2A and 2B is a circuit board that drives the display panel 12, and the drive board 14 is electrically connected to the display panel 12 through the flexible board 16. The drive board 14 is provided in front of the display panel 12 in a roll-up direction and is fixed to a main body 52 of the core 24 inside the main body 52. The roll-up direction is a direction in which the display panel 12 and other components move when the core 24 rolls up the display panel 12 and the other components. The drive board 14 is, for example, a printed circuit board (PCB).

The flexible board 16 illustrated in FIGS. 2A and 2B is a flexible circuit board that electrically connects the display panel 12 and the drive board 14. The flexible board 16 is connected to the display panel 12 and the drive board 14, and the flexible board 16 puts together the display panel 12 and the drive board 14. That is, the display panel 12 and the drive board 14 are linked through the flexible board 16. The flexible board 16 includes a part not overlapping the display panel 12 as viewed from the third direction in a state in which the flexible board 16 is drawn out from the core 24. The front end of the flexible board 16 in the roll-up direction is connected to the drive board 14. Note that the flexible board 16 may not be directly connected to the display panel 12 and the drive board 14. The flexible board 16 may be indirectly connected to the display panel 12 and the drive board 14 through, for example, another member. The flexible board 16 is, for example, a chip on film (COF).

The core 24 illustrated in FIGS. 1A to 2B is a roller to which the drive board 14 and the protection sheet 30 are fixed, the roller being configured to roll up the display panel 12 and the protection sheet 30. Specifically, the core 24 is a member around which the display panel 12 and the protection sheet 30 are rolled when the display panel 12 and the protection sheet 30 are to be rolled up. The core 24 includes the main body 52 and a through portion 54. The main body 52 has a substantially cylindrical shape with the second direction as the axial direction, and the front end of the protection sheet 30 in the roll-up direction is fixed to the peripheral surface of the main body 52. The through portion 54 penetrates the main body 52 in the radial direction of the main body 52 and extends in the axial direction of the main body 52. The flexible board 16 is inserted into the through portion 54.

The pantograph unit 26 illustrated in FIGS. 1A to 2B includes a first support member 56, a second support member 58, a first arm portion 60, and a second arm portion 62. The first support member 56 sandwiches the back end of the protection sheet 30 in the roll-up direction and is attached to the back end of the protection sheet 30 in the roll-up direction. The second support member 58 is fixed to a member (not illustrated) that supports the core 24 in a manner that the core 24 can be rotated. The first arm portion 60 and the second arm portion 62 connect the first support member 56 and the second support member 58 and apply force in directions in which the first support member 56 and the second support member 58 separate from each other.

The motor 28 illustrated in FIGS. 1A and 1B rotates the core 24. The motor 28 is rotated in one direction to rotate the core 24 in one direction about an axial center O. The first support member 56 moves in a direction away from the second support member 58, and the display panel 12 and other components are drawn out from the core 24 (see an arrow E1 in FIGS. 1A and 2A). The motor 28 is rotated in the other direction to rotate the core 24 in the other direction about the axial center O. The first support member 56 moves in a direction toward the second support member 58, and the display panel 12 and other components are rolled up (see an arrow E2 of FIGS. 1B and 2B).

[1-2. Configuration of Display Panel and Protection Sheet]

Figure 3:
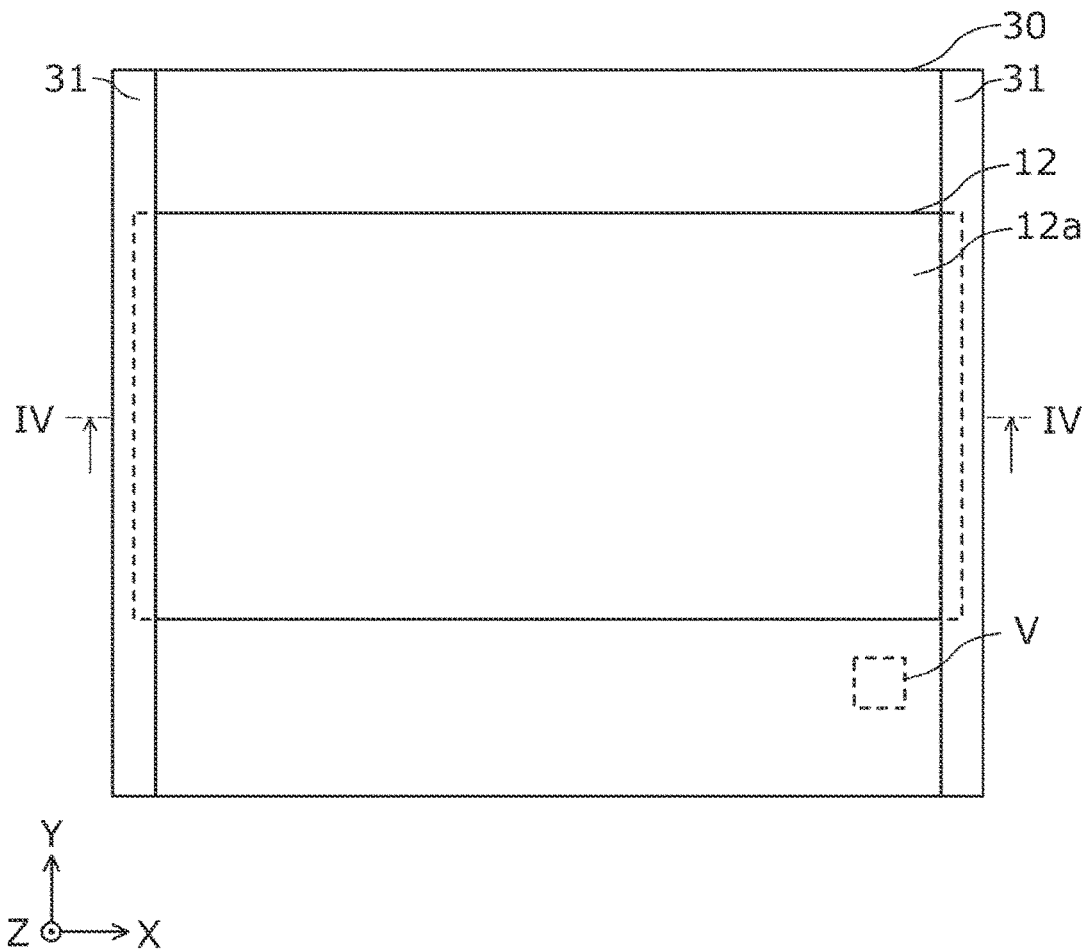
FIG. 3 is a schematic plan view illustrating a configuration of a display panel and a protection sheet according to the first embodiment.
Figure 4:
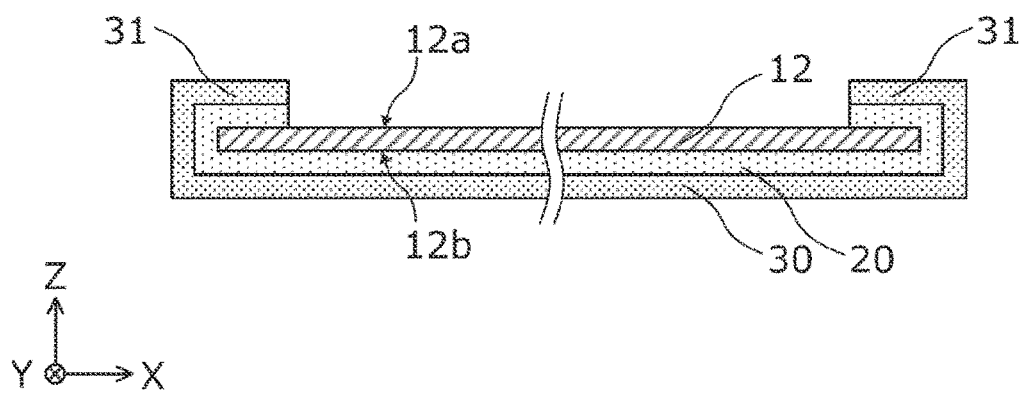
FIG. 4 is a schematic cross-sectional view illustrating the configuration of the display panel and the protection sheet according to the first embodiment.

Next, the display panel 12 and the protection sheet 30 will be described in detail with reference to FIGS. 3 and 4. FIG. 3 is a schematic plan view illustrating a configuration of the display panel 12 and the protection sheet 30 according to the present embodiment. FIG. 3 illustrates a plan view of the display surface 12a of the display panel 12. FIG. 4 is a schematic cross-sectional view illustrating the configuration of the display panel 12 and the protection sheet 30 according to the present embodiment. FIG. 4 illustrates a cross section along a line IV-IV in FIG. 3. Note that the adhesive member 20 is also illustrated in FIG. 4.

The protection sheet 30 is attached to the back surface 12*b* of the display panel 12, and this suppresses damage of the display surface 12*a* and the back surface 12*b* caused by contact between the display surface 12*a* and the back surface 12*b* of the display panel 12 when the display panel 12 and other components are rolled up. The protection sheet 30 is formed from woven fabric, and this can suppress the amount of elongation with respect to the tension in the state in which the protection sheet 30 is extended as illustrated in FIGS. 1A and 2A. In addition, the protection sheet 30 is formed from woven fabric, and the protection sheet 30 can be properly elongated to suppress application of excessive compressive stress to the display panel 12 when the display panel 12 and the protection sheet 30 are rolled up around the core 24. Moreover, the protection sheet 30 is formed from woven fabric, and a curl is unlikely to remain when the protection sheet 30 is rolled up around the core 24. The display panel 12 can maintain a high degree of flatness in the state in which the display panel 12 is drawn out from the core 24 as illustrated in FIG. 2A. Therefore, the attachment of the protection sheet 30 to the display panel 12 can suppress application of excessive tension to the display panel 12 when tension is applied to the protection sheet 30. This can suppress damage of the display panel 12. Note that, although the protection sheet 30 is directly attached to the back surface 12*b* of the display panel 12 through the adhesive member 20 in the present embodiment, the protection sheet 30 may be indirectly attached to the back surface 12*b*. For example, another member may be placed between the protection sheet 30 and the display panel 12.

The material of the protection sheet 30 is not particularly limited as long as the material is woven fabric. The woven fabric for forming the protection sheet 30 may contain, for example, synthetic fibers (that is, chemical fibers). This can provide woven fabric formed from fibers with desirable characteristics. Examples of the synthetic fibers that can be used include nylon fibers, aramid fibers, poly-p-phenylenebenzobisoxazole (PBO) fibers, and polyester fibers. Particularly, the nylon fibers, the aramid fibers, the PBO fibers, or other fibers can be used to obtain woven fabric with excellent strength, heat resistance, and cold resistance. Further, the nylon fibers, the polyester fibers, or other fibers can be used to obtained woven fabric at low cost. In the present embodiment, the woven fabric for forming the protection sheet 30 contains nylon fibers. The thickness of the woven fabric for forming the protection sheet 30 is not particularly limited. In the present embodiment, the thickness of the woven fabric for forming the protection sheet 30 is 300 μm.

Figure 5:
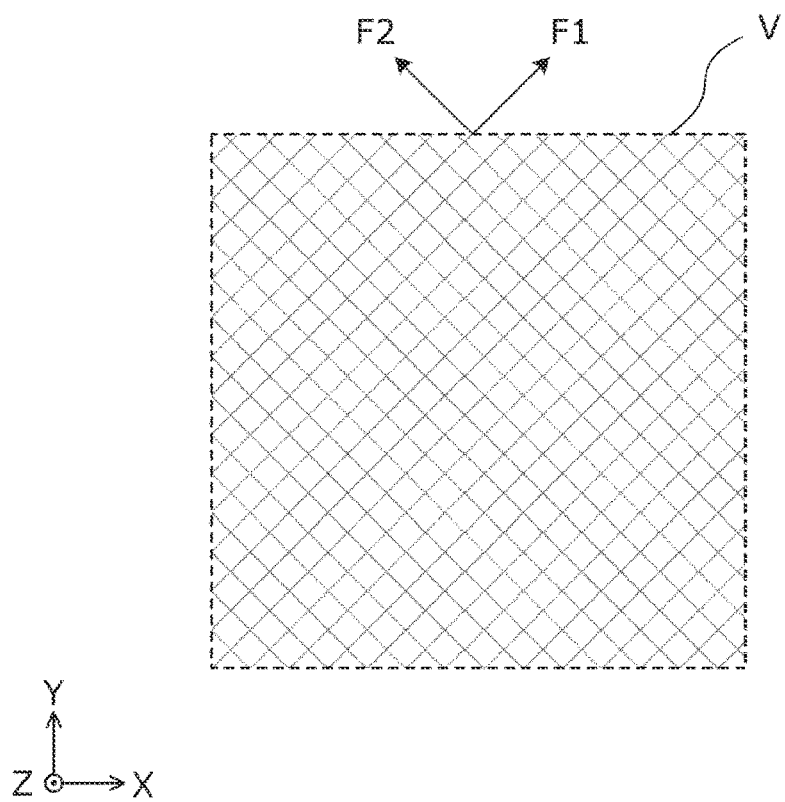
FIG. 5 is a schematic diagram illustrating a configuration of fibers contained in the protection sheet according to the first embodiment.

Next, a configuration of the woven fabric for forming the protection sheet 30 according to the present embodiment will be described with reference to FIG. 5. FIG. 5 is a schematic diagram illustrating a configuration of fibers contained in the protection sheet 30 according to the present embodiment. FIG. 5 is an enlarged view of the inside of a dotted frame in FIG. 3. A plurality of oblique lines illustrated in FIG. 5 represent fibers contained in the protection sheet 30.

As illustrated in FIG. 3, the display surface 12*a* of the display panel 12 has a rectangular shape. In the present embodiment, angles between longitudinal directions F1 and F2 of the fibers contained in the protection sheet 30 and edges of the display surface 12*a* extending in the X-axis direction and the Y-axis direction are equal to or greater than 30° but equal to or smaller than 60° as illustrated in FIG. 5. In such a way, the longitudinal directions F1 and F2 of the fibers contained in the protection sheet 30 are directions obliquely crossing the edges of the display surface 12*a*, and the protection sheet 30 can thus easily be elongated in directions parallel to the edges of the display surface 12*a*. For example, the protection sheet 30 can easily be elongated in the Y-axis direction when the display panel 12 is rolled up. As a result, the force of compressing the display panel 12 in the Y-axis direction decreases, and this can reduce the damage of the display panel 12. The edges of the protection sheet 30 are often cut along the directions parallel to the edges of the display surface 12*a*, and the configuration can prevent the longitudinal directions F1 and F2 of the fibers at the edges of the protection sheet 30 from becoming parallel to the edges. This can suppress loosening of the fibers at the edges of the protection sheet 30 formed from woven fabric. The angles between the longitudinal directions F1 and F2 of the fibers contained in the protection sheet 30 and the edges of the display surface 12*a* extending in the X-axis direction and the Y-axis direction may be equal to or greater than 40° but equal to or smaller than 50°. As a result, the protection sheet 30 can easily be elongated in the direction of either one of the edges of the display surface 12*a* extending in the X-axis direction and the Y-axis direction. This can further suppress loosening of the fibers at the edges of the protection sheet 30. In the present embodiment, the angles between the longitudinal directions F1 and F2 of the fibers contained in the protection sheet 30 and the edges of the display surface 12*a* are 45°.

Figure 6:
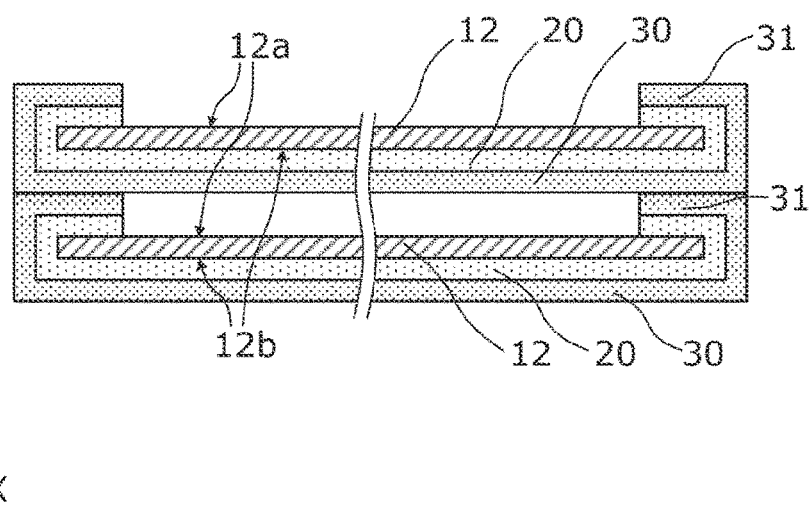
FIG. 6 is a schematic cross-sectional view illustrating a state in which the display panel and the protection sheet according to the first embodiment are rolled up.

As illustrated in FIG. 4, ends of the protection sheet 30 are bent from the back surface 12*b* side to the display surface 12*a* side of the display panel 12. In other words, the protection sheet 30 includes bent portions 31 arranged on the display surface 12*a* of the display panel 12. In the present embodiment, the ends of the protection sheet 30 in the X-axis direction are bent to form the bent portions 31. Note that the regions provided with the bent portions 31 in the display surface 12*a* are regions in which images positioned at the ends of the display surface 12*a* are not displayed. The effect of the bent portions 31 of the protection sheet 30 will be described with reference to FIG. 6. FIG. 6 is a schematic cross-sectional view illustrating the state in which the display panel 12 and the protection sheet 30 according to the present embodiment are rolled up. FIG. 6 illustrates a cross section parallel to the X-axis direction and the Z-axis direction (that is, thickness direction) of the display panel 12 and the protection sheet 30 in the state in which the display panel 12 and the protection sheet 30 are rolled up (see FIGS. 1B and 2B).

As illustrated in FIG. 6, because the protection sheet 30 according to the present embodiment includes the bent portions 31, a space is formed between the center of the display surface 12*a* of the display panel 12 in the X-axis direction and the protection sheet 30 placed above the display surface 12*a*. This can reduce the contact between the center of the display surface 12*a* in the X-axis direction and the protection sheet 30 even in the state in which the display panel 12 is rolled up. Therefore, the damage of the display surface 12*a* can be reduced.

The curvature of the part of the protection sheet 30 on the back surface 12*b* side of the display panel 12 and the curvature of the bent portions 31 are different in the state in which the protection sheet 30 is rolled up, and the amounts of elongation are different. Therefore, the ends of the protection sheet 30 in the X-axis direction may be deflected when the amount of elongation of the protection sheet 30 is uniform. The protection sheet 30 is formed from woven fabric, and it is thus difficult to vary the amount of elongation at each position in the direction parallel to the longitudinal direction of the fibers when the strength of the fibers contained in the woven fabric is high. In the present embodiment, the angles between the longitudinal directions of the fibers contained in the protection sheet 30 and the edges of the display surface 12a are equal to or greater than 30° but equal to or smaller than 60°, and therefore, the amount of elongation can be different at each position of the protection sheet 30 in the X-axis direction (that is, direction equal to or greater than 30° but equal to or smaller than 60° with respect to the longitudinal direction of the fibers). This can reduce the deflection at the ends of the protection sheet 30 in the X-axis direction.

As described above, the display apparatus 10 according to the present embodiment has a simplified configuration in which the protection sheet 30 is just attached to the display panel 12, and this can suppress the damage of the flexible display panel 12. Further, the display apparatus 10 according to the present embodiment has a simplified configuration, and therefore, the weight can be reduced, and the increase in the size of the pantograph unit 26, the motor 28, and other components can be suppressed even when the screen is enlarged.

Second Embodiment

A display apparatus according to a second embodiment will be described. The display apparatus according to the present embodiment is different from the display apparatus 10 according to the first embodiment in that the display apparatus further includes a plate-shaped member between the display panel 12 and the protection sheet 30. Hereinafter, the configuration of the display apparatus according to the present embodiment that is different from the configuration of the display apparatus 10 according to the first embodiment will mainly be described with reference to FIGS. 7 and 8.

Figure 7:
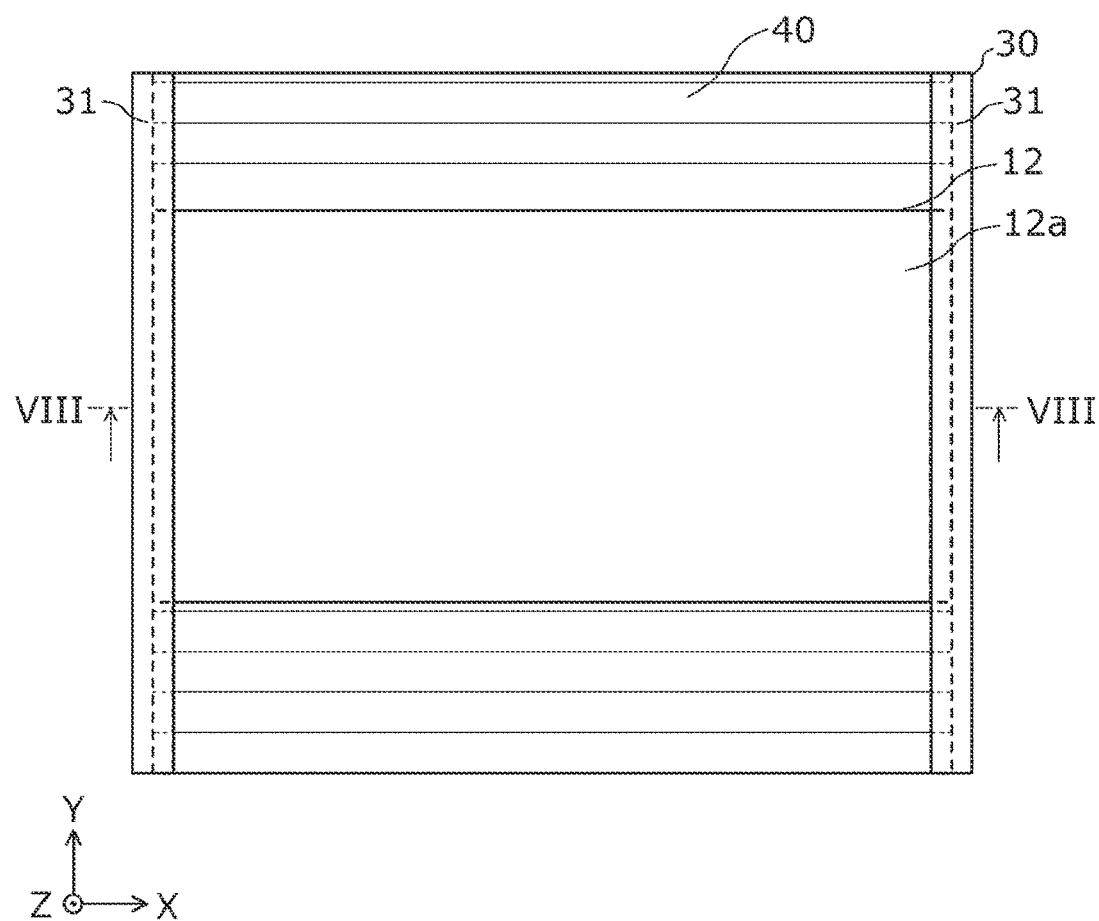
FIG. 7 is a schematic plan view illustrating a display panel, a plate-shaped member, and a protection sheet of a display apparatus according to a second embodiment.
Figure 8:
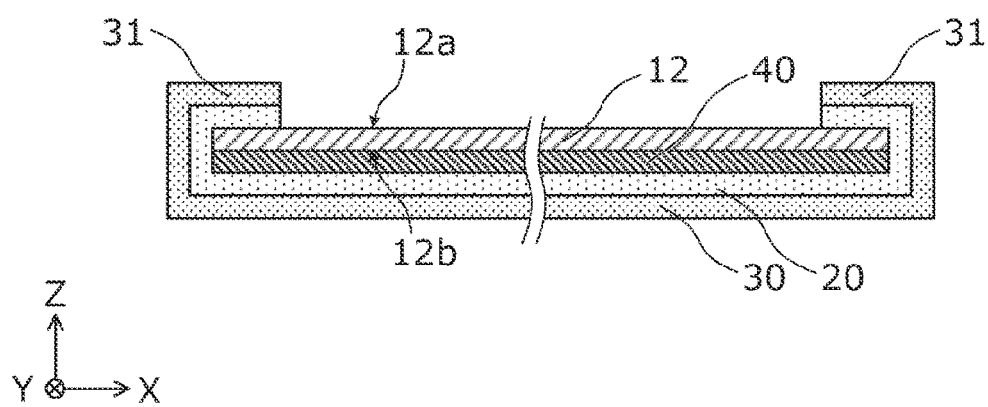
FIG. 8 is a schematic cross-sectional view illustrating the display panel, the plate-shaped member, and the protection sheet of the display apparatus according to the second embodiment.

FIGS. 7 and 8 are a schematic plan view and a schematic cross-sectional view, respectively, illustrating the display panel 12, a plate-shaped member 40, and the protection sheet 30 of the display apparatus according to the present embodiment. FIG. 8 illustrates a cross section along a line VIII-VIII in FIG. 7. As illustrated in FIGS. 7 and 8, the configuration of the display apparatus according to the present embodiment is similar to the configuration of the display apparatus 10 according to the first embodiment except that the display apparatus includes the plate-shaped member 40.

The plate-shaped member 40 is a member in a plate shape (or a sheet shape) arranged between the display panel 12 and the protection sheet 30. The configuration of the plate-shaped member 40 is not particularly limited as long as the plate-shaped member 40 is flexible. In the present embodiment, the plate-shaped member 40 is formed from stainless steel. More specifically, the plate-shaped member 40 is a flexible stainless sheet with a thickness of 200 μm. To increase the flexibility of the plate-shaped member 40, for example, one or more slits or one or more through holes may be formed on the plate-shaped member 40. Note that an adhesive member that bonds the plate-shaped member 40 and the display panel 12 may be arranged between the plate-shaped member 40 and the display panel 12.

An effect similar to the effect of the display apparatus 10 according to the first embodiment can also be obtained in the display apparatus according to the present embodiment. The display apparatus according to the present embodiment includes the plate-shaped member 40, and the back surface 12b of the display panel 12 can thus be protected. This can suppress the damage of the display panel 12. The rigidity of the plate-shaped member 40 may be higher than the rigidity of the display panel. In this way, the plate-shaped member 40 can more surely protect the display panel 12.

Modifications, Etc

Although the display apparatus according to each embodiment of the present disclosure has been described, the present disclosure is not limited to the individual embodiments. Various modifications of the embodiments conceived by those skilled in the art and modes constructed by combining constituent elements in different embodiments may also be included in the range of one or a plurality of modes of the present disclosure without departing from the scope of the present disclosure.

For example, although the display apparatus is rollable in each of the abovementioned embodiments, the display apparatus according to the present disclosure is not limited to the rollable display apparatus. For example, the display apparatus according to the present disclosure may be a bendable display apparatus or a slide display apparatus with variable bending position. Note that the display apparatus may be bent either inward (that is, the display apparatus is bent such that the display surface 12a of the display panel 12 is positioned inside) or outward (that is, the display apparatus is bent such that the display surface 12a of the display panel 12 is positioned outside).

Although the display panel 12 includes the OLED panel in each of the abovementioned embodiments, the display panel 12 is not limited to the panel including the OLED panel. The display panel 12 may be, for example, a quantum dot display panel with quantum dots.

Although the protection sheet 30 includes the bent portions 31 in each of the abovementioned embodiments, the protection sheet 30 may not necessarily include the bent portions 31.

Although the angles between the longitudinal directions of the fibers contained in the woven fabric for forming the protection sheet 30 and the edges of the display surface 12a are equal to or greater than 30° but equal to or smaller than 60° in each of the abovementioned embodiments, the angles between the longitudinal directions and the edges of the display surface 12a may be smaller than 30° or greater than 60°.

Although the shape of the display surface 12a of the display panel 12 is a rectangle in each of the abovementioned embodiments, the shape of the display surface 12a is not limited to the rectangle. The shape of the display surface 12a may be, for example, a circle.

The present disclosure can widely be used as a display apparatus in various video display apparatuses such as a personal digital assistant, a personal computer, and a television receiver.

What is claimed is:

1. A display apparatus, comprising:
a display panel that is flexible, the display panel including a display surface and a back surface on a back side of the display surface; and
a protection sheet attached to the back surface of the display panel and formed from woven fabric, wherein ends of the protection sheet are bent from the back surface to the display surface of the display panel, the protection sheet is formed from nylon fibers, and angles between a longitudinal direction of the nylon fibers and edges of the display surface are set such that the nylon fibers are elongated in directions parallel to the edges of the display surface in a state in which the display panel and the protection sheet are rolled up.

2. The display apparatus according to claim 1, wherein the woven fabric contains synthetic fibers.

3. The display apparatus according to claim 1, wherein the display surface has a rectangular shape, and the angles between the longitudinal direction of the nylon fibers contained in the woven fabric and the edges of the display surface are equal to or greater than 30° but equal to or smaller than 60°.

4. The display apparatus according to claim 3, wherein the angles between the longitudinal directions of the nylon fibers contained in the woven fabric and the edges of the display surface are equal to or greater than 40° but equal to or smaller than 50°.

5. The display apparatus according to claim 1, further comprising an adhesive member arranged between the display panel and the protection sheet, the adhesive member bonding the display panel and the protection sheet.

6. The display apparatus according to claim 5, further comprising a core which rolls up the display panel and the protection sheet placed above the display panel.

7. The display apparatus according to claim 6, wherein the core has a main body and a through portion that penetrates the main body in a radial direction of the main body, and the through portion receives a portion of a flexible board connected to the display panel.

8. The display apparatus according to claim 1, further comprising a plate-shaped member arranged between the display panel and the protection sheet.

9. The display apparatus according to claim 8, wherein the plate-shaped member is formed from stainless steel.

10. The display apparatus according to claim 1, wherein, in a rolled up state of the protection sheet, an amount of elongation of the nylon fibers is different at each position of the protection sheet in a direction equal to or greater than 30° and equal to or smaller than 60° with respect to the longitudinal direction of the nylon fibers.

11. The display apparatus according to claim 1, further comprising:

a first support member attached to the protection sheet;

a second support member opposed to the first support member; and a first arm portion and a second arm portion, wherein the first arm portion and the second arm portion connect the first support member to the second support member, and the first arm portion and the second arm portion are configured to apply a force in a direction in which the first support member is separated from the second support member.

* * * * *